(12) United States Patent
Plevyak

(10) Patent No.: US 6,799,398 B1
(45) Date of Patent: Oct. 5, 2004

(54) MODULAR SYSTEM FOR SECURING FLAT PANELS TO A CURVED SUPPORT STRUCTURE

(75) Inventor: Michael Plevyak, Bloomsburg, PA (US)

(73) Assignee: Skytech Systems, Inc., Bloomsburg, PA (US)

( * ) Notice: Subject to any disclaimer, the term of this patent is extended or adjusted under 35 U.S.C. 154(b) by 0 days.

(21) Appl. No.: 10/174,050

(22) Filed: Jun. 18, 2002

(51) Int. Cl.$^7$ .............................................. E04D 13/18
(52) U.S. Cl. ...................... 52/123.3; 52/81.2; 52/236.2
(58) Field of Search .............................. 52/173.3, 81.2, 52/236.2, 173.1, 81.3–81.5, 80.1, 11, 23, 24, 79.1, 41, 42, 43, 44, 90.1–93.2; 136/244, 252, 251, 246, 291, 248

(56) References Cited

U.S. PATENT DOCUMENTS

| | | |
|---|---|---|
| 4,621,472 A | 11/1986 | Kloke |
| 4,862,657 A | 9/1989 | Jentoft et al. |
| 4,987,705 A | 1/1991 | Sampson et al. |
| 5,103,603 A | 4/1992 | Verby et al. |
| 5,163,257 A | 11/1992 | Crowell |
| 5,291,705 A | 3/1994 | Dickerson |
| 5,394,664 A | 3/1995 | Nowell |
| 5,509,250 A | 4/1996 | Jensen et al. |
| 5,509,973 A * | 4/1996 | Ishikawa et al. ............. 136/251 |
| 5,571,338 A * | 11/1996 | Kadonome et al. ......... 136/251 |
| 5,580,620 A | 12/1996 | Campbell et al. |
| 5,617,682 A | 4/1997 | Christopher |
| 5,706,617 A * | 1/1998 | Hirai et al. ................. 52/173.3 |
| 5,746,839 A * | 5/1998 | Dinwoodie .................. 136/251 |
| 5,797,225 A | 8/1998 | Ishikawa |
| 6,088,978 A | 7/2000 | Satterwhite |
| 6,105,317 A * | 8/2000 | Tomiuchi et al. ........... 52/173.3 |
| 6,111,189 A * | 8/2000 | Garvison et al. ............ 136/244 |
| 6,606,830 B2 * | 8/2003 | Nagao et al. ............... 52/173.3 |
| 6,617,507 B2 * | 9/2003 | Mapes et al. ................ 136/251 |

* cited by examiner

Primary Examiner—Jeanette Chapman
(74) Attorney, Agent, or Firm—Cohen & Grigsby, P.C.

(57) ABSTRACT

A modular system (10) for attaching planar panels (12) to a curved support structure (14). The system includes modules (20) that are defined between a transverse hook support panel (36) and a transverse plate support panel (38) and between a base member (78) and a pivot member (80). Each module (20) defines one or more cells (18) in accordance with the use of transverse cross-support members (30). Each panel (12) is secured on a respective cell (18).

12 Claims, 4 Drawing Sheets

MODULAR SYSTEM FOR SECURING FLAT PANELS TO A CURVED SUPPORT STRUCTURE

BACKGROUND OF THE INVENTION

1. Field of the Invention

The subject invention relates to systems for affixing transparent panes to a curved canopy and, more particularly, systems for securing flat rigid panels to a curved canopy.

2. Description of the Prior Art

Various types of canopies and other roof structures have been developed and used for many years. Some of these structures incorporate the use of a transparent or translucent cover that shields precipitation, but that allows natural sunlight to pass through. Examples of such structures are shown and described in U.S. Pat. Nos. 6,088,978, 5,291,705, 4,862,657, 4,987,705, 5,103,603, 4,621,472, 5,797,225, 5,617,682, 5,509,250, 5,394,664, 5,163,257, and 5,580,620.

Prior roof structures have been dome-shaped or otherwise curved or vaulted for aesthetic and various other reasons. Typically, these roofs have been "stick built" meaning that they are assembled on-sight from specially designed elements. These designs generally involve vertical structural shapes that, in many cases, span the width of the overall structure. Such elements are typically composed of multiple segments that are connected by gussets or of large, curved structural shapes. However, such elements are both expensive and time consuming to manufacture. Also, these types of roofs have presented a persistent problem for using glass or glass-like transparent materials. Typically, such materials are brittle and cannot be easily bent to fit the contour of a curved roof. Although such materials can sometimes be made in a curved or convex shape, such shapes are relatively difficult and expensive to manufacture.

In the prior art, there were attempts to develop systems by which flat glass panels could be secured to a curved roof. For example, in some cases the glass panels were supported by molded gaskets, tapered spacer tubes, bar stock shims, and paired, telescoping channels. Such gaskets, spacer tubes shims and channels typically were formed to provide one side that was flat to match the glass panel and an opposite side that was contoured to match the contour of the rafter or other roof support structure. Therefore, such gaskets and similar elements were limited in that they had to match the contour or curvature of a particular rafter or other support member. Another difficulty with such gaskets and similar elements was that they often required the use of multiple lengths or types of screws or other fasteners. The particular length or type of the fastener depended on the location of the fastener on the panel and also varied with respect to the support member. This resulted in a large inventory of parts for assembly and made the assembly more complicated and time consuming.

As one alternative to the use of molded gaskets and functionally equivalent elements, glass modules or panes have been developed for application in a particular roof structure. However, in some cases these designs required large modules, curved metal profiles, or multiple shell extrusions; all of which were difficult and expensive to design, construct and install. In some cases, the modules incorporated relatively large, arc-shaped elements that were difficult and expensive to construct and transport to the place of assembly. In other cases, modular systems such as a split mullion design were found to be inefficient in that they incorporated redundant junctions for the modular units. This resulted in additional parts that increased the weight and cost of the roof. In some instances, these systems incorporated exposed exterior caps, gaskets and fasteners that presented potential leak points and also complicated the maintenance and cleaning of the roof after construction.

In some applications, it has been necessary to incorporate the use of photovoltaic cells with the prior art modular designs for curved roofs. In those situations, the exterior caps of the prior art modular systems shaded the photovoltaic cells and tended to trap dirt so as to increase the difficulty and expense of cleaning the cells.

Another objection to some prior art systems has been that their design requires numerous parts, large fasteners or has otherwise resulted in an assembly with a cluttered appearance or that is otherwise aesthetically objectionable. Also, prior art systems, including modular type systems, have been mechanically complicated. Their installation has required the use of specialty equipment and has generally also required the skills of specially trained installers.

Still another objection to systems for securing flat panels to a curved support structure as known in the prior art has been that the known designs were deficient in some practical respects. For example, some designs did not provide for certain practical features such as a maintenance walkway.

Accordingly, there was a need in the prior art for a mechanically simple, cost effective modular system by which flat glass panels and the like could be secured to rounded or domed roof structures. The need included modular systems having lower manufacturing, installation and maintenance costs. Preferably, such an improved system would eliminate the need for external caps. Also, there was a need for a modular system that would allow replacement of individual panels without the disturbing adjacent panels. For the particular application of photovoltaic panels, there was also a need for a system having a low vertical profile such that the photovoltaic panels would remain unshaded at times of low solar azimuth.

SUMMARY OF THE INVENTION

In accordance with the invention that is disclosed herein, a modular system secures panels to a domed or vaulted canopy or roof that includes at least two rafters or other parallel support members. The system includes a module wherein a transverse hook support panel is supported on a first rafter of the roof system. The module further includes a transverse plate support panel that is oriented substantially parallel to the transverse hook support panel and that is supported on a rafter that is adjacent to the first rafter. The module further includes a base member that is secured between the plate support panel and the hook support panel. In addition, the module includes as pivot member that is also secured between the plate support panel and the hook support panel. Also, the module includes hook glazing members that cooperate with the hook support panel and with one of the base member or the pivot member. In addition, the module includes plate glazing members that cooperate with the plate support panel and the other of the base member or the pivot member. The hook glazing members and the plate glazing members are attached to the panel to secure the panel to the module.

Preferably, the hook support panel, the plate support panel, the base member and the pivot member define a cell and a transverse cross-support member is connected between the base member and the pivot member to section the cell. The cross-support member further includes a hook support surface and a base support surface. The hook support surface of the cross-support member is coupled to the hook glazing member and the plate support surface is attached to the plate glazing member. The hook glazing members and the plate glazing members are attached to the panel to secure the panel to the module.

Also preferably, the transverse plate support and the transverse hook support are included in respective first and second transverse joints with each of the transverse joints further including a transverse guide member. The transverse guide member defines a hook support panel slot and a plate support panel slot. The hook support panel slot receives an edge of the hook support panel and the plate support panel slot receives an edge of the plate support panel. The transverse guide member thereby supports the hook support panel and the plate support panel.

More preferably, the pivot member has a bearing structure that comprises a flange and the base member has a pedestal and a platform. The pedestal comprises a wall in combination with an elbow panel that are each connected to the platform of the base member. The wall has a top edge and the elbow panel has a distal edge. The top edge and the distal edge define a slot between them and the flange of the pivot member extends through the slot. The flange contacts the top edge of the wall such that the pivot member pivots on the top edge of the wall.

Most preferably, the flange of the pivot member further includes a toe that contacts the elbow panel. The elbow panel cooperates with the flange to oppose the pivotal movement of the pivot member in the direction away from the riser panel of the base member.

Other features, objects and advantages of the disclosed invention will become apparent to those skilled in the art as a presently preferred embodiment of the disclosed invention proceeds.

BRIEF DESCRIPTION OF THE DRAWINGS

The presently disclosed invention is shown and described in connection with the accompanying drawings wherein.

DESCRIPTION OF A PREFERRED EMBODIMENT

Figure 1:
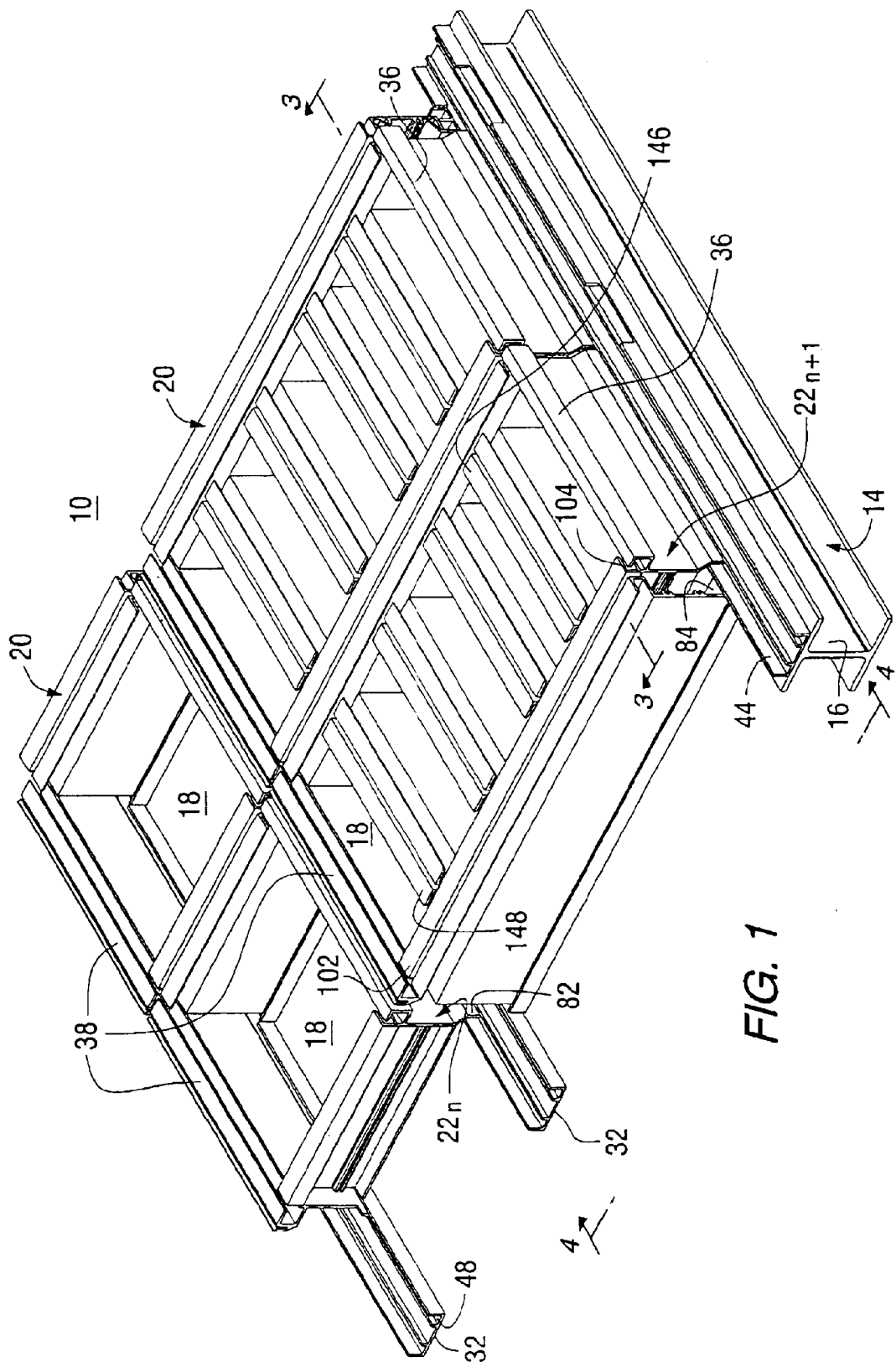
FIG. 1 is a perspective drawing of a modular system in accordance with the presently disclosed invention.
Figure 2:
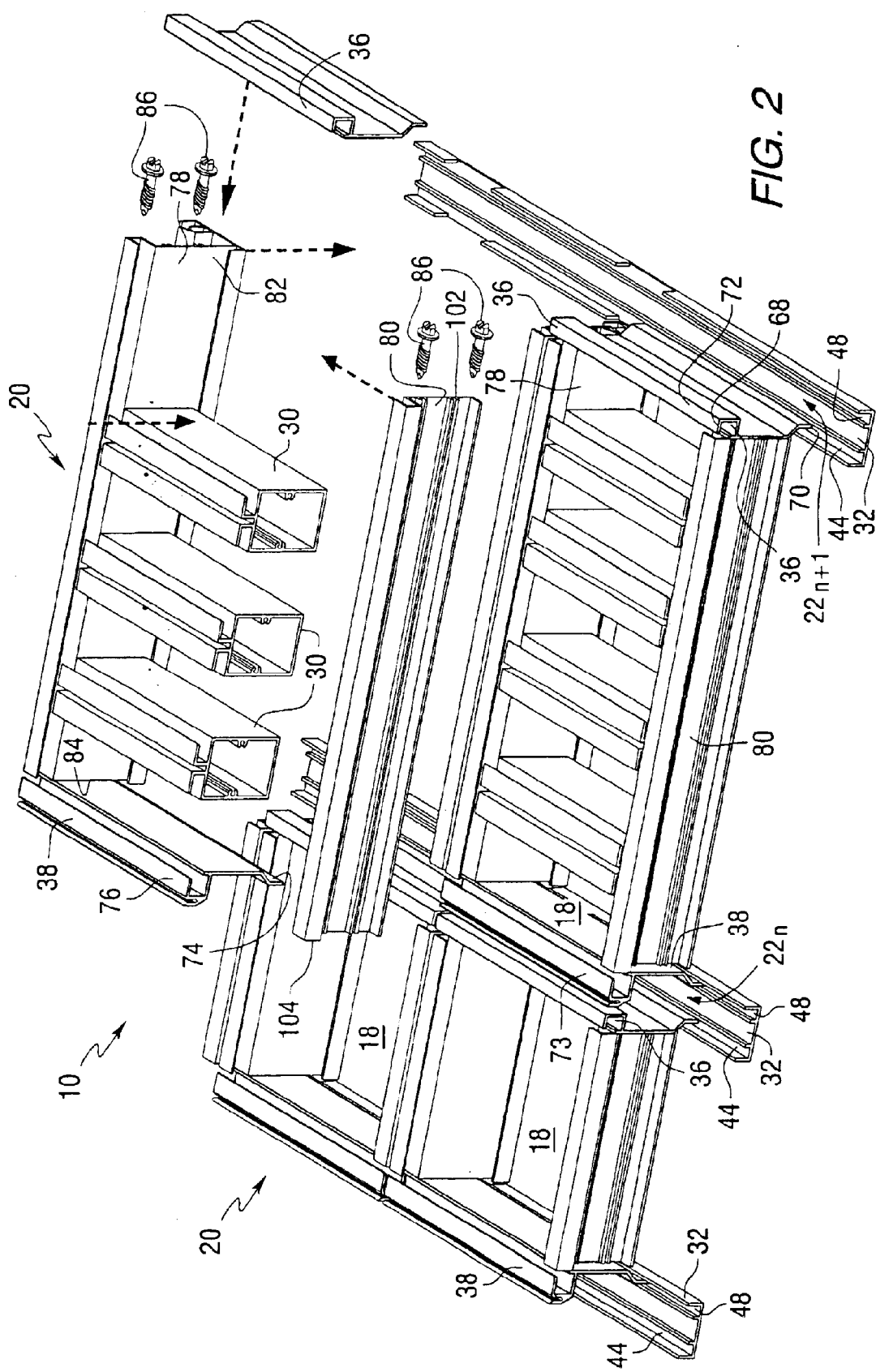
FIG. 2 is an exploded view of the modular system shown in FIG. 1.
Figure 3:
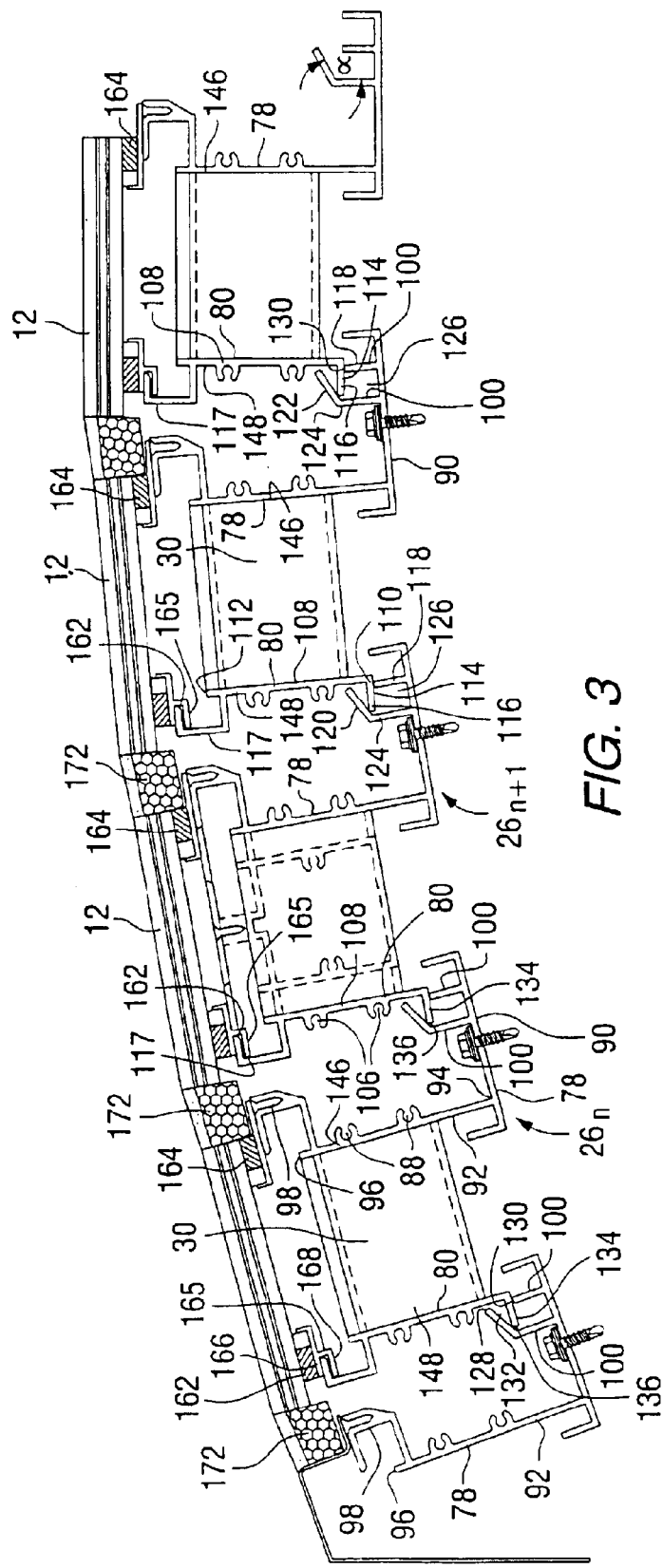
FIG. 3 is a side elevation section of the modular system of FIG. 1 taken along the lines 3—3 of FIG. 1 and showing the lateral panel joints of the modular system and further showing photovoltaic panels.
Figure 4:
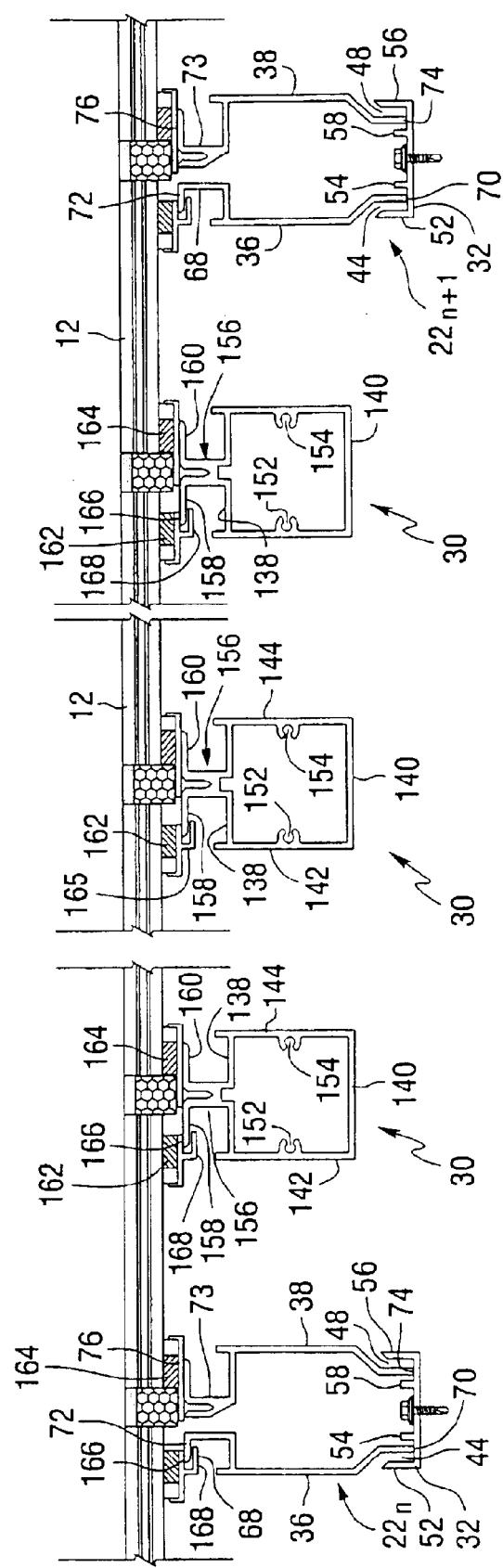
FIG. 4 is a front elevation section of the modular system of FIG. 1 taken along the lines 4—4 of FIG. 1 and showing the transverse joints and transverse cross-support members of the modular system and further showing photovoltaic panels.

A presently preferred embodiment of the presently disclosed invention is shown and described in connection with FIGS. 1–4 which show a modular system 10 for attaching planar panels such as photovoltaic panels 12, to a curved support structure 14. In particular, the example of FIGS. 1–4 relates to attaching flat panels, such as photovoltaic panels 12, to a domed or vaulted roof support structure 14. Typically, domed or vaulted roofs or canopies have a support structure that includes a multiple of rafters 16 that support a cover. The cover is formed from a multiple of panels 12 that are individually secured to the roof support structure by the modular system 10. The rafters 16 are curved according to the design of the particular roof to accomplish the intended structural and aesthetic purposes. The modular system 10 accommodates the curvature of the rafters and also secures the panels 12 to the rafters 16 as herein is more particularly described.

Each of the panels 12 is secured in a respective cell 18 that is formed within a module 20 of the system 10. The cells 18 are defined between transverse joints $22_n$ and $22_{n+1}$ that are adjacent in an array of transverse joints $22_{a\ldots x}$ in combination with lateral panel joints $26_n$ and $26_{n+1}$ that are adjacent in an array of lateral panel joints $26_{a\ldots y}$ and with one or more transverse cross-support members 30 as hereinafter is more fully explained.

Each transverse joint 22 includes a transverse guide member 32, a transverse hook support panel 36, and a transverse plate support panel 38. Transverse guide members 32 define respective hook support panel slots 44 and plate support panel slots 48. Hook support panel slot 44 is defined between an external wall 52 and an internal wall 54 and plate support panel slot 48 is defined between an external wall 56 and an internal wall 58.

Transverse hook support panel 36 includes a top end 68 and a lower edge 70. Top end 68 of the hook support panel is fashioned to provide a surface 72 that will support a glazing member as hereinafter is more fully described. The lower edge 70 of the hook support panel is retained by the hook support panel slot 44 of a transverse guide member 32, with lower edge 70 being supported by the transverse guide member 32.

Because transverse guide member 32 is supported on a rafter 16 and rafter 16 is curved, transverse guide member 32 follows the curvature of rafter 16. Lower edge 70 of hook support panel can also be contoured to follow the curvature of guide member 32, however, this is not a necessary limitation of the presently disclosed invention. The longitudinal length of hook support panel 36 is short enough in comparison to the radius of curvature of the surface of guide member 32 such that hook support panel 36 can also be supported on guide member 32 when the lower edge 70 of the hook support panel 36 is substantially straight.

Transverse plate support panel 38 includes a top end 73 and a lower edge 74. Top end 73 of the plate support panel 38 is fashioned to provide a surface 76 that will support a glazing member as hereinafter is more fully described. The lower edge 74 of the plate support panel 38 is retained by a plate support panel slot 48, with lower edge 74 being supported by the transverse guide member 32.

Because transverse guide member 32 is supported on a rafter 16 and rafter 16 is curved, transverse guide member 32 follows the curvature of rafter 16. Lower edge 74 of plate support panel 38 can also be contoured to follow the curvature of guide member 32, however, this is not a necessary limitation of the presently disclosed invention. The longitudinal length of plate support panel 38 is short enough in comparison to the radius of curvature of the surface of guide member 32 such that plate support panel 38 can also be supported on guide member 32 when the lower edge 74 of the plate support panel 38 is substantially straight.

Each lateral panel joint 26 includes a base member 78 and a pivot member 80. Base member 78 has one longitudinal end 82 that is secured to the transverse hook support panel 36 and a second longitudinal end 84 that is secured to the transverse plate support panel 38. Base member 78 can be secured to transverse hook support panel 36 and transverse plate support panel 38 by means of mechanical fasteners such as screws 86 that anchor in screw bosses 88 that are formed in base member 78. Base member 78 includes a platform 90 and a riser panel 92 having a first edge 94 that is secured to the platform 90 in fixed relationship and also having a second edge 96 that is oppositely disposed on the riser panel 92 from the first edge 94. Base member 78 further includes a plate support 98 that is connected to the riser panel 92 adjacent to the second edge 96. Also, base member 78 includes a pedestal 100 that is connected to the platform 90.

Pivot member 80 which is also included in panel joint 26 has one longitudinal end 102 that is secured to the transverse hook support panel 36 and a second longitudinal end 104 that is secured to the transverse plate support panel 38. Pivot member 80 can be secured to transverse hook support panel 36 and transverse plate support panel 38 by means of mechanical fasteners such as screws 86 that anchor in screw bosses 106 that are formed in pivot member 80.

Pivot member 80 contacts the pedestal 100 of base member 78 and pivots on pedestal 100 such that the pivot member 80 of a given lateral panel joint $26_n$ can be oriented in substantially parallel relationship with the base member 78 in the panel joint $26_{n+1}$ that is adjacent thereto. More specifically, pivot member 80 includes a planar section 108 that has a first edge 110 and a second edge 112 that is oppositely disposed from the first edge 110. A bearing structure 114 is connected to planar section 108 at the first edge 110 and a hook support 116 is connected to planar section 108 adjacent to the second edge 112. The bearing structure 114 of pivot member 80 is supported on the pedestal 100 of base member 78. This allows pivot member 80 to pivot on pedestal 100 such that, during assembly of the module 20, the planar section 108 of the pivot member 80 can be aligned in substantial parallel relationship with the riser panel 92 of the base member 80 of the adjoining panel joint 26.

From the present description of the preferred embodiment, it will become apparent to those skilled in the art that the substantially parallel relationship of a pivot member 80 in one panel joint 26 with a base member 78 of an adjacent panel joint 26 allows both the pivot member 80 and the base member 78 to be oriented in substantially orthogonal relationship to the panel 12 that is connected to each of them. In this way, the disclosed modular structure compensates for the curvature of the supporting rafters 16 and provides a foundation for securing the panel to the curved rafter 16.

In accordance with the presently preferred embodiment of FIGS. 1–4, the bearing structure 114 of pivot member 80 is in the shape of a flange 116 that is secured to the first edge 110 of planar section 108. In a structure that is cooperative with flange 116, pedestal 100 of the base member 78 includes a wall 118 that is secured in fixed relationship to the platform 90 of base member 78. Pedestal 100 also includes an elbow panel 120 that is also secured in fixed relationship to the platform 90 of base member 78 and laterally with respect to wall 118. Elbow panel 120 includes two planar panels 122 and 124 that joined in fixed relationship to each other and that define an obtuse angle £ therebetween on the side of elbow panel 120 that opposes wall 118. Wall 118 and elbow panel 120 thus cooperate with platform 90 to define a channel 126.

Elbow panel 120 further includes a distal edge 128 and wall 118 further includes a top edge 130 that cooperates with distal edge 128 to define a slot 132 therebetween. Flange 116 of pivot member 80 extends through slot 132 with a side 134 of flange 116 contacting the top edge 130 of wall 118 such that the pivot member 80 pivots on the top edge 130 of wall 118. The flange 116 of pivot member 80 includes a toe 136 that contacts the upper panel 122 of flange 116 such that wall 118 and elbow panel 120 cooperate to oppose the pivotal movement of pivot member 80 in the direction away from the riser panel 92 of base member 78.

In accordance with the presently disclosed invention, module 20 can define a cell 18 between a plate support panel 38 of one transverse joint 22 and a hook support panel 36 of an adjacent transverse joint 22; and between a base member 78 of one lateral panel joint 26 and a pivot member 80 of an adjacent lateral panel joint 26.

As shown in FIGS. 1–4 of the presently preferred embodiment, the panel 12 is secured to the module 20 by two hook glazing members 162 and two plate glazing members 164. Each hook glazing member 162 is secured to a panel 12 by silicone glue or other adhesive. Each hook glazing member 162 includes a fork structure 165 that has tines 166 and 168. The two hook glazing members 162 are located on each panel 12 such that when the modular system is assembled, the tines 166 and 168 of one hook glazing member 162 engage opposite sides of the top end 68 of transverse hook support panel 36 and the tines 166 and 168 of the second hook glazing member 162 engage opposite sides of the flange 116 of pivot member 80.

Each plate glazing member 164 is also secured to the panel 12 by silicone glue or other adhesive. The two plate glazing members 164 are located on each panel 12 such that when the modular system is assembled, one plate glazing member 164 opposes the surface 76 of the top end 73 of a plate support panel 38 and the second plate glazing member 164 opposes the plate support 98 of the base member 78. The one plate glazing member 164 is secured to the top end 73 of the plate support panel 38 and the second plate glazing member is secured to the plate support 98 of the base member 78.

The arrangement of hook glazing members 162 in cooperation with a transverse hook support panel 36 in one transverse joint 22 and a pivot member 80 of one lateral panel joint 26; and plate glazing members 164 in cooperation with a transverse plate support panel 38 in a second transverse joint 22 and a base member 78 of a second lateral panel joint 26 provides a structure for installing and/or removing a selected panel 12 without disturbing any adjacent panels in the modular system.

Specifically, the panel is oriented such that the fork 165 of one hook glazing member 162 is positioned laterally from the top end 68 of transverse hook support panel 36 the fork 165 of the second hook glazing member 162 is positioned laterally from the flange 116 of pivot member 80. The panel 12 is then moved diagonally so that one fork engages the top end 68 of transverse hook support panel 36 and the second fork engages the flange 116 of the pivot member 80. With the diagonal movement of the panel 12 to engage the transverse hook support panel 36 and the pivot member 80, one plate glazing member 164 is brought into registry with the top end 73 of the plate support panel 38 and the second plate glazing member 164 is brought into registry with the plate support 98 of the base member 78. The two plate glazing members 164 are then secured to the plate support 98 of the base member 78 and the top end 73 of the plate support panel 38 to secure the panel 12 to the modular structure.

A seal 172 is placed over the plate glazing members 162 to weather-proof the assembled panels 12. Seal 172 can be a foam or other seal of the type that is know in the art and that provides a low vertical profile. In this way, the seal does not block or interfere with sunlight that is directed at panels 12.

To remove the panel 12, it is required only to remove the seal 172 to expose the fasteners of the plate glazing member 164. The fasteners are then removed and the plate can be moved laterally and in a diagonally direction to free the hook glazing members 162 from the transverse hook support panel 36 and the pivot member 80. The panel 12 can then be lifted vertically and removed from the modular system.

As a further improvement, module 20 can further include one or more transverse cross-support members 30 that further cooperate with the transverse joints 22 and the lateral panel joints 26 to define additional cells 18 within the module 20. This allows the modular system to accept smaller panels that are lighter and easier to handle while still limiting the weight of the modular system.

As shown in FIGS. 1–4, transverse cross-support members 30 include upper and lower sides 138 and 140 that are generally aligned orthogonally with respect to vertical sides 142 and 144. Transverse cross-support members 30 further include a first longitudinal end 146 that is secured to base member 78 of one lateral panel joint 26 and a second longitudinal end 148 that is secured to pivot member 80 of an adjacent lateral panel joint 26. Transverse cross-support members 30 can be secured to base member 78 and pivot member 80 by mechanical fasteners such as screws 150 that extend through base member 78 or pivot member 80 and are anchored in screw bosses 152 and 154 such as are formed in vertical sides 138 and 140. In this way, transverse cross-support members 30 divide the module 20 into additional cells 18, with each cell 18 receiving a respective panel 12. The additional structure of one or more transverse cross-support members increases the strength and stability of module 20.

Transverse cross-support member 30 further includes a crown 156 that has first and second arms 158 and 160 respectively. First arm 158 cooperates with a hook glazing member 162 and second arm 160 cooperates with a plate glazing member 164. In the manner previously described herein, when module 20 includes at least one transverse cross-support member 30, the transverse cross-support member cooperates with the base member 78 of one lateral panel joint 26 and with the pivot member 80 of an adjacent lateral panel joint 26 to define three sides of the cell 18. The fourth side of the cell is defined by a transverse hook support panel 36, a transverse plate support panel 38, or another transverse cross-support member 30.

In a manner analogous to that previously explained with regard to module 20 with only a single cell, the panel 12 is secured to the module 20 by two hook glazing members 162 and two plate glazing members 164. Each hook glazing member 162 is secured to a panel 12 by silicone glue or other adhesive. Each hook glazing member 162 includes a fork structure 165 that has tines 166 and 168. The two hook glazing members 162 are located on each panel 12 such that when the modular system is assembled, the tines 166 and 168 of one hook glazing member 162 engage opposite sides of either the top end 68 of transverse hook support panel 36 or the arm 158 of a transverse cross-support member 30. The tines 166 and 168 of the second hook glazing member 162 engage opposite sides of the flange 116 of pivot member 80.

As in the case of a module 20 with no cross-support member 30, each plate glazing member 164 is also secured to the panel 12 by silicone glue or other adhesive. The two plate glazing members 164 are located on each panel 12 such that when the modular system is assembled, one plate glazing member 164 opposes either the surface 76 of the top end 73 of a plate support panel 38 or the arm 160 of a transverse cross-support member 30. The second plate glazing member 164 opposes the plate support 98 of the base member 78. The one plate glazing member 164 is secured either to the top end 73 of the plate support panel 38 or to an arm 160 of the crown 156 of the cross-support member 30. The second plate glazing member is secured to the plate support 98 of the base member 78.

Accordingly, hook glazing members 162 cooperate with either a transverse hook support panel 36 in one transverse joint 22 and or an arm 158 of a cross-support member 30 together with a pivot member 80 of one lateral panel joint 26. Plate glazing members 164 cooperate with either a transverse plate support panel 38 in a second transverse joint 22 or an arm 160 of a cross-support member 30 together with a base member 78 of a second lateral panel joint 26. In the manner previously explained herein, this arrangement provides a structure for installing and/or removing a selected panel 12 without disturbing any adjacent panels in the modular system.

Specifically, the panel is oriented such that the fork 165 of one hook glazing member 162 is positioned laterally from the top end 68 of transverse hook support panel 36 or the arm 158 of the cross-support member 30, depending on the parts that define the particular cell. The fork 165 of the second hook glazing member 162 is positioned laterally from the flange 116 of pivot member 80. The panel 12 is then moved diagonally so that one fork engages either the top end 68 of transverse hook support panel 36 or the arm 158 of cross-support member 30. The second fork engages the flange 116 of the pivot member 80. With the diagonal movement of the panel 12 to engage the transverse hook support panel 36 or the cross-support member 30 and the pivot member 80, one plate glazing member 164 is brought into registry with either the top end 73 of the plate support panel 38 or the arm 160 of the cross-support member 30, depending on the parts that define the particular cell. The second plate glazing member 164 is brought into registry with the plate support 98 of the base member 78. The two plate glazing members 164 are then secured to the plate support 98 of the base member 78 and either the top end 73 of the plate support panel 38 or the ram 160 of the cross-support member 30 to secure the panel 12 to the modular structure.

In the manner also previously explained, a seal 172 is placed over the plate glazing members 162 to weather-proof the assembled panels 12. Seal 172 can be a foam or other seal of the type that is known in the art and that provides a low vertical profile. In accordance with the invention herein disclosed, the seal is applied to all four sides of the panel 12. In this way, the seal protects against leakage on the entire perimeter of the panel 12. At the same time, the seal does not rely on any caps or external fasteners so that is does not block or interfere with sunlight that is directed at panels 12.

Also, all of the structure that secures the panels to the modular system and that secure the modular system to the roof support structure is below the top surface of the panels 12. There are no exterior panels, caps, or fasteners so that the disclosed modular system affords relatively low maintenance and is easier to clean that systems that employ such exterior parts.

As another advantage of the modular system herein disclosed, the modules 20 have planar upper and lower surfaces such that they are relatively easy to package, store, ship and install.

While a presently preferred embodiment of the disclosed invention has been disclosed herein, the scope of the disclosed invention is not limited thereto, but can be otherwise variously embodied within the scope of the following claims.

What is claimed is:

1. A module for securing panels to first and second rafters, said module comprising:
   (A) a transverse hook support panel that is supported by the first rafter;
   (B) a transverse plate support panel that is oriented substantially parallel to said transverse hook support panel, said transverse plate support panel being supported by the second rafter;
   (C) a base member having one longitudinal end that is secured to said transverse hook support panel and having a second longitudinal end that is secured to said transverse plate support panel, said base member including:
      (1) a platform;
      (2) a riser panel having first and second edges, the first riser edge being secured in fixed relationship to said platform;
      (3) a support member that is connected to the second riser edge; and
      (4) a pedestal that is connected to said platform;
   (D) a pivot member having one longitudinal end that is secured to said transverse hook support panel and having a second longitudinal end that is secured to said transverse plate support panel, said pivot member contacting the pedestal of said base member, said pivot member having
(1) a planar section with first and second edges;
(2) a structure connected to the first edge of the planar section; and
(3) a support member that is connected to the second edge of the planar section;
(E) a first hook glazing member that engages the transverse hook support panel and a second hook glazing member that engages the support member of one of the base member or the pivot member; and
(F) a first plate glazing member that engages the transverse plate support panel and a second plate glazing member that engages the support member of the other of said base member or said pivot member, said first and second plate glazing members cooperating with said first and second hook glazing members to secure the panel to the rafters.

2. The module of claim 1, said module further comprising:
At least one transverse cross-support member, said transverse cross-support member being longitudinally aligned in substantially parallel relationship with respect to said transverse hook support panel and said transverse plate support panel, said transverse cross-support member having;
(1) a first longitudinal end that is connected to said base member; and
(2) a second longitudinal end that is connected to said pivot member such that the transverse cross-support member cooperates with the base member and with the pivot member; and such that the base member and the pivot member cooperate with the transverse hook support panel and with the transverse plate support panel to form a rigid grid that defines at least two cells, each of said cells receiving a respective panel.

3. The module of claim 1, said module further comprising:
a plurality of transverse cross-support members, each of said transverse cross-support members being longitudinally aligned in substantially parallel relationship with respect to each other and with respect to said transverse hook support panel and said transverse plate support panel, each of said transverse cross-support members respectively having;
a first longitudinal end that is connected to said base member; and
a second longitudinal end that is connected to said pivot member such that transverse cross-support members cooperate with the base member and with the pivot member; and such that said base member and the pivot member cooperate with the transverse hook support panel and with the transverse plate support panel to form a rigid grid that defines at least three cells for receiving a respective panel.

4. A modular system for securing photovoltaic units to an array of substantially parallel members that define a generally arcuate shape, with adjacent parallel members being respectively connected by a parallel array of cross-members, said modular system comprising:
(A) a transverse hook support panel that is supportable by a first parallel member;
(B) a transverse plate support panel that is oriented substantially parallel to said transverse hook support panel, said transverse plate support panel being supportable by a second parallel member;
(C) a base member having one longitudinal end that is secured to said transverse hook support panel and having a second longitudinal end that is secured to said transverse plate support panel, said base member including:
(1) a platform;
(2) a riser panel having first and second edges, the first riser edge being secured in fixed relationship to said platform;
(3) a plate support that is connected to the second riser edge; and
(4) a pedestal that is connected to said platform;
(D) a pivot member having one longitudinal end that is secured to said transverse hook support panel and having a second longitudinal end that is secured to said transverse plate support panel that contacts the pedestal of said base member, said pivot member having
(1) a planar section with first and second edges;
(2) a bearing structure connected to the first edge of the planar section; and
(3) a hook support that is connected to the second edge of the planar section;
(E) at least one transverse cross-support members, each transverse cross-support member being longitudinally aligned in substantially parallel relationship with respect to other transverse cross-support members and with respect to said transverse hook support panel and said transverse plate support panel, each of transverse cross-support member respectively having;
(1) a first longitudinal end that is connected to said base member; and
(2) a second longitudinal end that is connected to said pivot member such that the transverse cross-support member cooperates with the base member and with the pivot member; and such that said base member and the pivot member cooperate with the transverse hook support panel and with the transverse plate support panel to form a rigid grid that defines cells for receiving photovoltaic units;
(F) first and second hook glazing members that respectively engage;
(1) the hook support of the pivot member; and
(2) one of the hook support panel and a cross-support member; and
(G) first and second plate glazing members that respectively engage;
(1) the plate support of the base member; and
(2) one of the transverse plate support panel and a cross-support member, said first and second plate glazing members cooperating with said first and second hook glazing members to secure the photovoltaic unit to the rigid grid.

5. The modular system of claim 4 wherein said photovoltaic unit has a top surface and a bottom surface and wherein said first and second plate glazing members and said first and second hook glazing member are secured to the bottom surface of the photovoltaic unit by adhesive material.

6. The modular system of claim 5 wherein photovoltaic units that are located in adjacent cells are separated by a seal strips that cover the plate glazing members.

7. A modular system for securing photovoltaic units to an array of substantially parallel members that define a generally arcuate shape, with adjacent parallel members being respectively connected by a parallel array of cross-members, said modular system comprising:
(A) a transverse hook support panel that is supportable by a first parallel member;

(B) a transverse plate support panel that is oriented substantially parallel to said transverse hook support panel, said transverse plate support panel being supportable by a second parallel member; and (C) first and second lateral panel joints, each of said first and second lateral panel joints respectively having;
  (1) a base member with one longitudinal end that is secured to said transverse hook support panel and with a second longitudinal end that is secured to said transverse plate support panel, said base member including:
    (a) a platform;
    (b) a riser panel having first and second edges, the first riser edge being secured in fixed relationship to said platform;
    (c) a plate support that is connected to the second riser edge; and
    (d) a pedestal that is connected to said platform; and
  (2) a pivot member having one longitudinal end that is secured to said transverse hook support panel and having a second longitudinal end that is secured to said transverse plate support panel that contacts the pedestal of said base member, said pivot member having
    (a) a planar section with first and second edges;
    (b) a bearing structure connected to the first edge of the planar section; and
    (c) a hook support that is connected to the second edge of the planar section;

(D) a plurality of transverse cross-support members, each of said transverse cross-support members being longitudinally aligned in substantially parallel relationship with respect to each other and with respect to said transverse hook support panel and said transverse plate support panel, each of said transverse cross-support members respectively having;
  (1) a first longitudinal end that is connected to the base member of one of said first and second lateral joints, and
  (2) a second longitudinal end that is connected to the pivot member of the other of said first and second lateral joints, such that transverse cross-support members cooperate with the base member of said first lateral panel joint and with the pivot member of said second lateral panel joint and such that said base member of said first lateral panel joint and the pivot member of said second lateral panel joint cooperate with the transverse hook support panel and with the transverse plate support panel to form a rigid grid that defines cells for receiving photovoltaic units;

(E) first and second hook glazing members that respectively engage;
  (1) the hook support of the pivot member of the second lateral panel joint; and
  (2) one of the transverse hook support panel and the cross-support member; and (F) first and second plate glazing members that respectively engage;
  (1) the plate support of the first lateral panel joint; and
  (2) one of the transverse plate support panel and the cross-support member, said first and second plate glazing members cooperating with said first and second hook glazing members to secure the photovoltaic unit to the rigid grid.

8. The modular system of claim 7 wherein the bearing structure of said pivot member comprises a flange and wherein the pedestal of the base member comprises a wall and an elbow panel, said wall and said elbow panel each being connected to the platform of the base member, said elbow panel having a distal edge and said wall having a top edge such that the distal edge and the top edge cooperate to define a slot therebetween, the flange of said pivot member extending through said slot and contacting the top edge of the wall such that the pivot member pivots on the top edge of the wall.

9. The modular system of claim 8 wherein one side of the flange of said pivot member contacts the top edge of the wall and wherein the flange of said pivot member has a toe that contacts the elbow panel, such that the wall and the elbow panel cooperate to oppose the pivotal movement of said pivot member in the direction away from the riser panel of the base member.

10. A modular system for securing photovoltaic units to an array of substantially parallel members that define a generally arcuate shape, with adjacent parallel members being respectively connected by a parallel array of cross-members, said modular system comprising:

(A) first and second transverse joints, each of said first and second transverse joints having;
  (1) a transverse hook support panel that is supportable by a first rafter; and
  (2) a transverse plate support panel that is oriented substantially parallel to said transverse hook support panel, said first and second transverse joints being supportable by first and second parallel members respectively;

(B) a base member having one longitudinal end that is secured to said transverse hook support panel of said first transverse joint and having a second longitudinal end that is secured to said transverse plate support panel of said second transverse joint, said base member including:
  (1) a platform;
  (2) a riser panel having first and second edges, the first riser edge being secured in fixed relationship to said platform;
  (3) a plate support that is connected to the second riser edge; and
  (4) a pedestal that is connected to said platform;

(C) a pivot member having one longitudinal end that is secured to said transverse hook support panel of said first transverse joint and having a second longitudinal end that is secured to said transverse plate support panel of said second transverse joint and that contacts the pedestal of said base member, said pivot member having
  (a) a planar section with first and second edges;
  (b) a bearing structure connected to the first edge of the planar section; and
  (c) a hook support that is connected to the second edge of the planar section;

(C) a plurality of transverse cross-support members, each of said transverse cross-support members being longitudinally aligned in substantially parallel relationship with respect to each other and with respect to said transverse hook support panel of said first transverse joint and with respect to said transverse plate support panel of said second transverse joint, each of said transverse cross-support members respectively having;
  (1) a first longitudinal end that is connected to the base member, and
  (2) a second longitudinal end that is connected to the pivot member such that transverse cross-support members cooperate with the base member and with the pivot member and such that said base member and the pivot member cooperate with the transverse hook support panel of the first transverse joint and with the transverse plate support panel of the second transverse joint to form a rigid grid that defines cells for receiving photovoltaic units;

(D) first and second hook glazing members that respectively engage;
  (1) the hook support of the pivot member; and
  (2) one of the transverse hook support panel of the first transverse joint or a cross-support member; and (E) first and second plate glazing members that respectively engage;
  (1) the plate support; and
  (2) one of the transverse plate support panel of the second transverse joint and the cross-support member, said first and second plate glazing members cooperating with said first and second hook glazing members to secure the photovoltaic unit to the rigid grid.

11. The modular system of claim 10 wherein said first and second transverse joints further include a transverse guide member, said transverse guide member defining a hook support panel slot and a plate support panel slot, said hook support panel slot receiving an edge of the hook support panel and said plate support panel slot receiving an edge of the plate support panel such that the transverse guide member supports the hook support panel and the plate support panel at times when the transverse guide member is secured to one of the parallel members of the array.

12. A modular system for securing photovoltaic units to an array of substantially parallel members that define a generally arcuate shape, with adjacent parallel members being respectively connected by a parallel array of cross-members, said modular system comprising:

(A) first and second transverse joints, each of said first and second transverse joints having;
  (1) a transverse hook support panel that is supportable by a first rafter; and
  (2) a transverse plate support panel that is oriented substantially parallel to said transverse hook support panel, said first and second transverse joints being supportable by first and second parallel members respectively;

(B) first and second lateral panel joints, each of said first and second lateral panel joints respectively having;
  (1) a base member having one longitudinal end that is secured to said transverse hook support panel and having a second longitudinal end that is secured to said transverse plate support panel, said base member including:
    (a) a platform;
    (b) a riser panel having first and second edges, the first riser edge being secured in fixed relationship to said platform;
    (c) a plate support that is connected to the second riser edge; and
    (d) a pedestal that is connected to said platform; and
  (2) a pivot member having one longitudinal end that is secured to said transverse hook support panel and having a second longitudinal end that is secured to said transverse plate support panel that contacts the pedestal of said base member, said pivot member having
    (a) a planar section with first and second edges;
    (b) a bearing structure connected to the first edge of the planar section; and
    (c) a hook support that is connected to the second edge of the planar section;

(C) a plurality of transverse cross-support members, each of said transverse cross-support members being longitudinally aligned in substantially parallel relationship with respect to each other and with respect to said transverse hook support panel and said transverse plate support panel, each of said transverse cross-support members respectively having;
  (1) a first longitudinal end that is connected to the base member of one of said first and second lateral joints, and
  (2) a second longitudinal end that is connected to the pivot member of the other of said first and second lateral joints, such that transverse cross-support members cooperate with the base member of said first lateral panel joint and with the pivot member of said second lateral panel joint and such that said base member of said first lateral panel joint and the pivot member of said second lateral panel joint cooperate with the transverse hook support panel and with the transverse plate support panel to form a rigid grid that defines cells for receiving photovoltaic units;

(D) first and second hook glazing members that respectively engage;
  (1) the hook support of the pivot member of the second lateral panel joint; and
  (2) One of the transverse hook support panel and the cross-support member; and (E) first and second plate glazing members that respectively engage;
  (1) the plate support of the first lateral panel joint; and
  (2) one of the transverse plate support panel and the cross-support member, said first and second plate glazing members cooperating with said first and second hook glazing members to secure the photovoltaic unit to the rigid grid.

* * * * *